(No Model.) 2 Sheets—Sheet 1.
J. R. HARD.
GALVANIC BATTERY.
No. 457,116. Patented Aug. 4, 1891.
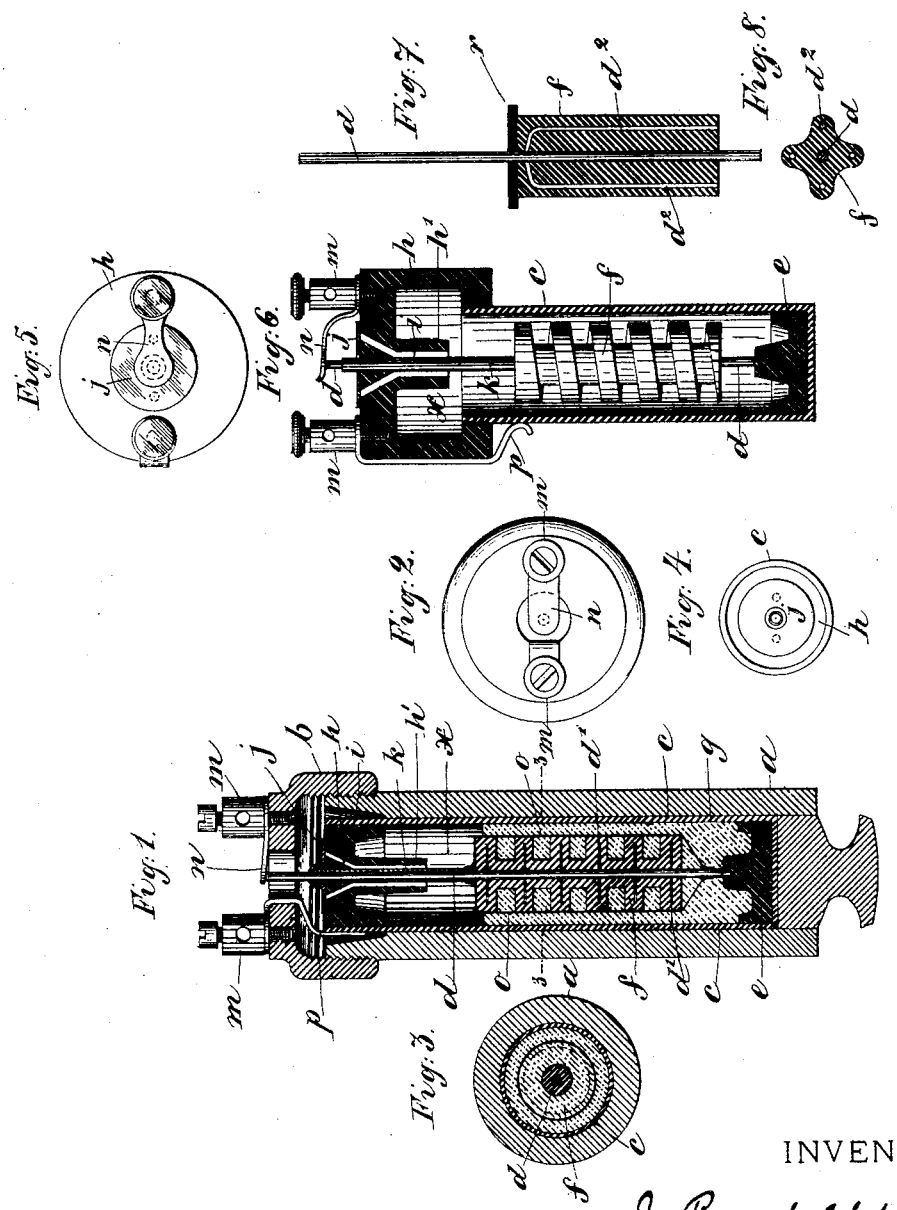
INVENTOR:
J. Randolph Hard
WITNESSES:
By Henry Connett
Attorney.

(No Model.) 2 Sheets—Sheet 2.
J. R. HARD.
GALVANIC BATTERY.

No. 457,116. Patented Aug. 4, 1891.

WITNESSES:

INVENTOR
J. Randolph Hard
By Henry Connett
Attorney.

UNITED STATES PATENT OFFICE.

JOHN RANDOLPH HARD, OF NEW YORK, N. Y.

GALVANIC BATTERY.

SPECIFICATION forming part of Letters Patent No. 457,116, dated August 4, 1891.

Application filed February 6, 1891. Serial No. 380,440. (No model.)

*To all whom it may concern:*

Be it known that I, JOHN RANDOLPH HARD, a citizen of the United States, and a resident of the city, county, and State of New York, have invented certain Improvements in Galvanic Batteries, of which the following is a specification.

My invention relates in the main to the class of open-circuit dry batteries, and the novel features of the invention will be fully set forth hereinafter, and carefully defined in the claims.

In the present instance I have shown my improvements embodied in a cell wherein the positive element is a zinc cup of tubular form and the negative element is a rod or piece of chloride of silver, this latter being immersed in an excitant mixed with some mucilaginous or gelatinous substance, which renders it too stiff or immobile to flow. The zinc cup constitutes one pole of the cell, and a wire of silver, embedded at one end in the negative element and projecting outward through a closing plug or stopper in the cup, constitutes the other pole of the cell. In cells of this general class it has been found that when the battery is in action gases are generated and some liquid also is formed, which rises to the surface of the excitant compound, and the internal pressure therefrom often bursts the inclosing casing. Where a stopper of porous material has been employed to close the zinc cup, the pores thereof, which are of a capillary nature, are liable to become clogged with the viscid liquid, and thus cut off the escape of the gases, and this is inevitable where the cell is inverted or even permitted to rest on its side. My object is, in part, to correct these defects by providing a gas outlet or outlets and means whereby the liquid is prevented from closing said outlets should the cell be inverted or turned on its side. Another object is to provide the gas-outlet of the cell with a valve to prevent the access of air to the exciting compound, as will be described. Other features of novelty will be set forth hereinafter.

Figure 10:
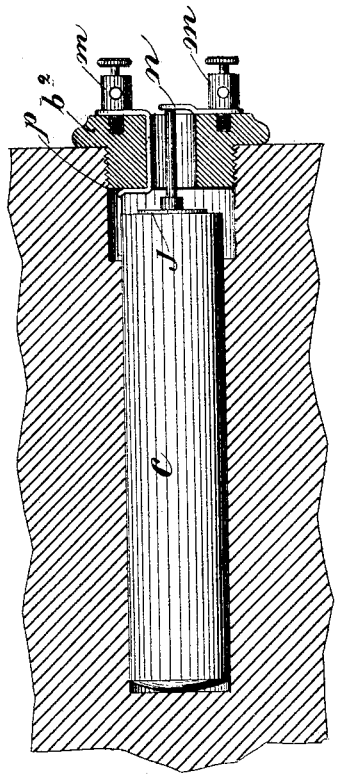
Figure 11:
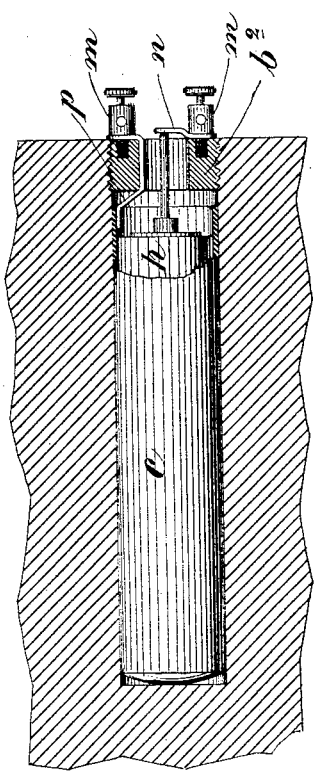
Figure 9:
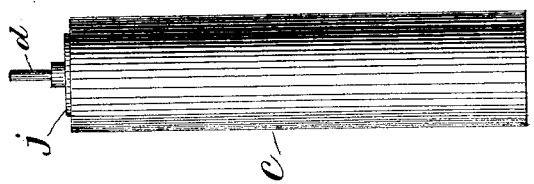

In the drawings which serve to illustrate an embodiment of my invention, Figure 1 is a longitudinal axial section of battery-cell embodying my invention set in a casing. Fig. 2 is an end view or plan view of the same. Fig. 3 is a transverse section of same, taken on line 3 3 in Fig. 1; and Fig. 4 is an end view of the cell detached. Fig. 5 is an end view, and Fig. 6 a longitudinal axial section, of a slightly-different form of battery-cell embodying my invention. Figs. 7 and 8 are respectively longitudinal and transverse sections of a modified form of the chloride-of-silver element of the cell. Fig. 9 is a side elevation of the cell detached from the casing. Figs. 10 and 11 are views illustrating a mode of mounting the battery-cell in a casing formed by boring a hole in a timber or any structure of wood.

Referring, primarily, to the first four figures of the drawings, which illustrate the essential features of the cell, $a$ represents an outer casing, which may be of wood, hard rubber, or the like, and $b$ is the cap of the same, which may be of the same material. The cap is here shown as arranged to screw onto the open end of the casing $a$.

$c$ is the zinc cup forming the positive element of the galvanic cell. As here shown, this cup is of an elongated cylindrical form.

$d$ is a metal rod or wire of silver, which rests at its lower end on an insulating washer or piece $e$ in the bottom of the cup $c$. On the rod $d$ is the negative or chloride-of-silver element $f$ of the cell. By preference this element will be of substantially cylindrical form, with circumferential grooves formed in it, as clearly shown in Fig. 1. Surrounding the element $f$ is the excitant compound $g$. This compound will be stiff or jelly-like, and it will enter into the lateral grooves or recesses in the element $f$. The open end of the zinc cup is closed by a stopper $h$, which will be by preference of wood, hard rubber, or the like.

The rod $d$ passes out through an aperture in the stopper $h$, and in the latter is formed one or more gas-outlets $i$, which may be closed by a self-closing valve $j$, mounted on the stopper. This valve may be in the form of a rubber disk, secured to the stopper or to a rubber protecting-covering $k$ on the rod $d$. The valve $j$ seals the chamber containing the exciting compound and prevents the access of air thereto. If the air has access to this compound, it will have the effect of drying it by removing its moisture, and thus to a degree render the excitant inert. The valve also keeps out dust and foreign substances which might clog or stop up the gas-outlet, and thus interfere with the proper operation of the cell.

On the cap $b$ are mounted the binding-posts $m$, to which the circuit-wires are secured. Connected electrically with the respective binding-posts are metallic contacts $p$ and $n$, the former being so placed as to form a rubbing contact with the outer face of the zinc cup $c$ when the cap $b$ is screwed on, and the latter being arranged to bear elastically on the projecting tip of the rod $d$ under the same conditions. The casing $a$ is enlarged or cut away at its open end in order to make room for the contact $p$.

I will now explain more fully some of the details of the construction and explain the purpose thereof. The insulating-piece $e$ is recessed in its upper face in order to increase the distance between the rod $d$ and the wall of the cup $c$, measured over the surface of said piece $e$. I believe the insulation is better under these conditions than it would be if this surface were a plane. In order to increase the surface of contact between the chloride-of-silver electrode $f$ and the rod $d$, I prefer to secure on the rod $d$, primarily, disks of silver $d'$ at proper intervals, and when the chloride is melted and molded about said rod these disks will be embedded in the chloride, as seen in Fig. 1. I find, also, that it improves the action of the cell to wrap the chloride-of-silver electrode wholly or in part in a cloth or fibrous fabric coated with plumbago or finely-divided carbon, the ends of said fabric being secured to the rod $d$. This fabric $o$ is seen in Fig. 1. The fibrous and absorbent nature of this wrapping permits the excitant compound to pass through it with sufficient freedom, and the conductive coating of the fabric sets up a galvanic action quickly when the circuit is closed. As before stated, when these cells are in action a liquid collects above the excitant, and as the cell will sometimes require to be placed on its side, or even be inverted, this liquid will naturally collect about the plug $h$. To obviate the difficulties growing out of this, I leave a considerable space $x$ between the element $f$ and the stopper $h$, or within the stopper, to receive this liquid, and I form a centrally-arranged nipple $h'$ on the stopper $h$, within which is the gas-outlet. Thus whatever position the cell may occupy—erect, on its side, or inverted—the accumulation of liquid will not reach and obstruct the gas-outlet. The excitant compound will be quite stiff or immobile, and its engagement with the lateral recesses in the chloride-of-silver electrode will tend to prevent the displacement of said compound.

Should gas be generated in the cell, it can never reach such a tension as would burst or injure the cell, as the valve will rise and permit it to escape under a moderately-low tension.

Figs. 5 and 6 illustrate a slightly-different construction, wherein the stopper that closes the zinc cup is arranged to fit over the open end of the cup. In this form of the cell the binding-posts and contacts are mounted directly on the stopper. In this view the chloride-of-silver element is seen in elevation, and it is in the form of a screw. The exciting compound is not shown in Fig. 6.

Figs. 7 and 8 show a form of the chloride-of-silver element which has silver wires $d^2$ extending through it longitudinally, the element being fluted.

Figs. 10 and 11 show the battery-cell set in a hole bored in wood, which may represent the frame or casing about a door. In Fig. 10 the hole is counterbored, and a plug $b^2$, corresponding in function to the cap $b$ of Fig. 1, is screwed into the larger part of the bore. In Fig. 11 the general construction is the same as that in Fig. 10, except that the hole is not counterbored to receive the plug, which latter has substantially the same diameter as the cell. In this construction the stopper $h$ of the cell is set back or in a little way, and the contact $p$ enters the zinc cup and bears against its inner face exterior to the stopper. The zinc cup is broken away in this view to show the special construction.

If the chloride-of-silver element $f$ be not provided with lateral grooves for preventing the movement or shifting of the exciting compound, or if said compound be somewhat too liquid, a washer of porous material may be placed in the cup $c$ over the element $f$. Such a washer $r$ is seen in Fig. 7.

The coating of carbon on the strip $o$ may be placed on the inner face of said strip, so as to form a coating on the element $f$, and one mode of carrying out this feature of the invention would be to apply a coating of the conducting material to the surface of the chloride of silver and then cover it with a thin absorbent fabric.

The conical enlargement of the casing $a$, as seen in Fig. 1, serves to force the spring contact-piece $p$ inwardly against the zinc cup $c$ as the cap $b$ is screwed down on the casing and to cause the said piece to rub frictionally over the surface of the zinc and effect a good contact.

Having thus described my invention, I claim—

1. A closed galvanic cell having a gas-outlet in its closing-stopper, and a self-closing valve controlling said outlet, said valve opening outwardly, substantially as set forth.

2. A galvanic cell having a closing-stopper provided with a centrally-arranged inwardly-projecting nipple, and with a gas-outlet extending through said nipple and stopper, substantially as set forth.

3. A galvanic cell having a closing-stopper provided with a centrally-arranged inwardly-projecting nipple, with a gas-outlet extending through said nipple and stopper, and a self-closing valve which opens outwardly and controls the gas-outlet, substantially as set forth.

4. A galvanic cell comprising a zinc cup forming one element, a circumferentially-recessed piece of chloride of silver arranged within said cup and forming the other element, a stopper which closes the zinc cup, a rod of silver connected with the chloride and extending out through said stopper, and an excitant compound in which said chloride element is immersed, the said excitant occupying the recesses in the chloride, substantially as set forth.

5. The combination, with a galvanic cell having a zinc cup $c$, which forms the positive element, and a rod $d$, forming the negative element, of a cap adapted to screw onto the zinc cup or its casing, and contact-pieces $p$ and $n$, carried by said cap and adapted to be put into contact, respectively, with the cup $c$ and rod $d$ when the cap is in place.

6. In a galvanic cell, the negative element comprising a circumferentially-grooved piece of chloride of silver $f$, a rod $d$, of silver, extending into said chloride, and disks or plates $d'$, of silver, attached to said rod and embedded in the chloride, substantially as set forth.

7. In a galvanic cell wherein the negative element is chloride of silver, the combination, with said chloride of silver, of a conductive coating of carbon applied to the surface of said chloride element, substantially as set forth.

8. In a galvanic cell wherein the negative element is of chloride of silver, the combination, with said chloride element and the silver rod $d$, of a strip of fibrous material $o$, coated with carbon and applied to said chloride element and rod, substantially as and for the purposes set forth.

In witness whereof I have hereunto signed my name in the presence of two subscribing witnesses.

J. RANDOLPH HARD.

Witnesses:
HENRY CONNETT,
JOHN D. CAPLINGER.